No. 651,232. Patented June 5, 1900.
M. S. CARMONA.
TYPE WRITER.
(Application filed Aug. 17, 1899.)
(No Model.) 6 Sheets—Sheet 1.

WITNESSES
H Walker
John Lotka

INVENTOR
M. S. Carmona
BY
ATTORNEYS

No. 651,232. Patented June 5, 1900.
M. S. CARMONA.
TYPE WRITER.
(Application filed Aug. 17, 1899.)

(No Model.) 6 Sheets—Sheet 3.

WITNESSES:
INVENTOR
M. S. Carmona
BY
ATTORNEYS

No. 651,232. Patented June 5, 1900.
M. S. CARMONA.
TYPE WRITER.
(Application filed Aug. 17, 1899.)

(No Model.) 6 Sheets—Sheet 4.

WITNESSES:
H. Walker
John Lotka

INVENTOR
M. S. Carmona
BY
ATTORNEYS

THE NORRIS PETERS CO., PHOTO-LITHO., WASHINGTON, D. C.

No. 651,232. Patented June 5, 1900.
M. S. CARMONA.
TYPE WRITER.
(Application filed Aug. 17, 1899.)
(No Model.) 6 Sheets—Sheet 5.

No. 651,232. Patented June 5, 1900.
M. S. CARMONA.
TYPE WRITER.
(Application filed Aug. 17, 1899.)
(No Model.) 6 Sheets—Sheet 6.

WITNESSES:
INVENTOR
ATTORNEYS

UNITED STATES PATENT OFFICE.

MANUEL SÁNCHEZ CARMONA, OF MEXICO, MEXICO.

TYPE-WRITER.

SPECIFICATION forming part of Letters Patent No. 651,232, dated June 5, 1900.

Application filed August 17, 1899. Serial No. 727,505. (No model.)

*To all whom it may concern:*

Be it known that I, MANUEL SÁNCHEZ CARMONA, of the city of Mexico, Mexico, have invented new and useful Improvements in Type-Writers, of which the following is a full, clear, and exact description.

My invention relates to that class of type-writers in which the writing-surface is stationary, while the type is located upon a carriage which travels over the writing-surface. In such machines (an example of which is found in the type-writer forming the subject-matter of my application for a patent, Serial No. 716,835, filed May 15, 1899) the carriage generally also supports the keyboard, which the operator therefore has to follow in the movement of the carriage.

The main object of my present invention is to separate the keyboard from the carriage in a machine of the above-indicated class, making the keyboard stationary and securing an increased speed of operation, since the writer need not change the position of his hand. Also the carriage obviously becomes lighter and moves more readily, this being another factor tending to increase the speed.

Other features of my invention will appear from the description following hereinafter.

The novel elements and combinations employed by me to secure the desired result will be pointed out in the appended claims.

In the accompanying drawings I have shown my invention as applied to a type-writer of the five-key system described, among others, in my above-mentioned application for patent, Serial No. 716,835. In type-writers of this system the type is brought into the printing position or "located" by operating the keys either singly or in various combinations according to a table which the operator keeps in sight or commits to memory. As some operators might prefer to employ the usual keyboard, I have devised a "synthetizer," comprising a main keyboard of the usual character and connections from it to the five-key apparatus to operate the keys of said apparatus either singly or in combination as required for each key of the main keyboard.

Reference is to be had to the accompanying drawings, forming a part of this specification, in which similar characters of reference indicate corresponding parts in all the figures.

Fig. 3 is a rear elevation. Fig. 3ª is a detail plan of one end of the carriage. Fig. 8 is an end view of the machine without the synthetizer and showing the parts in their working position. Fig. 18 is a diagrammatic plan of a modification.

The machine, briefly described, comprises the following parts: a stationary keyboard consisting of a limited number of keys, a synthetizer having the full number of keys, as hereinbefore mentioned, a carriage and a guide for the same, a type-box movable in the carriage for the purpose of bringing any one of several series of type into the printing position, type-carriers located in the type-box and each having one series of type, an impression mechanism and a carriage-feed mechanism, a mechanism for shifting the type-box, a type-locating mechanism controlled by the keys to move the types of one series so as to bring any one of them into the printing position, a paper-feed mechanism, and a base consisting of hinged sections, the keys carried by the base also having hinge-joints to permit of folding the machine into a comparatively-small compass.

I will now proceed to describe the parts in the order above mentioned.

*The keyboard*, Figs. 1, 2, 4, 8, and 11.—There are five type-locating keys 20 21 22 23 24 and two type-box-shifting keys 25 26. The type-locating keys are movable vertically, being pivoted about horizontal axes 27, while the laterally-disposed shifting-keys are pivoted about vertical axes 28, so as to be movable sidewise. The pivots 27 are located at different distances from the front ends of the keys, so that with an equal movement of the front ends the movement at the rear end will be smallest for the levers 20 and 21, somewhat increased (about twofold) for the lever 22, and still further increased for the levers 23 and 24, (about fourfold.) At their rear ends the levers of the keys carry operating projections 29, Fig. 4.

*The synthetizer*, Figs. 4 and 11 to 17.—To the same section 30 of the base over which the keys are normally arranged (see Fig. 8) I secure posts 31, to which may be secured (detachably, if desired) the frame 32 of the synthetizer. This synthetizer comprises a keyboard with substantially the usual arrangement of keys 33, held in their upper position by springs 34. Some of the keys 33 are arranged to operate only one of the keys 20 to 24. Others operate two of said keys, others three, still others four, and one operates all the five keys 20 to 24 in unison. This is effected as follows: Five U-shaped levers 35 are pivoted below the keyboard of the synthetizer about axes 36, the central member of each lever 35 extending longitudinally over one of the keys 20 to 24 and having a central projection 37 engaging such key. Where only one of the keys 20 to 24 is to be operated, Fig. 15, the corresponding key 33 operates a lever 38, extending from left to right of the keyboard, said lever being pivoted at 39 and carrying a shoe 40, engaging the corresponding lever 35. When two of the keys 20 to 24 are to be operated, Fig. 16, the shoe 40ª is a double one to engage two of the levers 35 and is preferably carried pivotally by its lever 38. For operating three keys, Fig. 17, the double shoe 40ª is attached not directly to the key 38, but to a shoe 40ᵇ, pivotally connected with said key and engaging a third lever 35. In an analogous manner four or five keys may be operated by one of the keys 33. (See Fig. 13.) The synthetizer also has two keys 41 to operate the shifting-keys 25 26 by means of bell-crank levers 42, adapted to engage the shifting-key 25 or 26, respectively.

*The carriage and carriage-guide*, Figs. 1 to 6, 8, and 9.—Longitudinally of the base extends the carriage-guide 43, which, for a purpose to be stated hereinafter, is pivoted to the base at 44 and is normally held in a raised position by a spring 45. This guide is dovetailed or otherwise constructed to receive the sliding carriage 46, having guide-lugs 47, spaced to receive between them a sliding extension 48. The purpose of this extension is to support the carriage should it travel beyond the end of the guide 43, as it will when starting a line. In this case the extension 48 is pulled out to project beyond the guide 43 at the left-hand end, the extension projecting far enough into the guide to provide the necessary support for the overhanging portion of the carriage.

Figure 5:
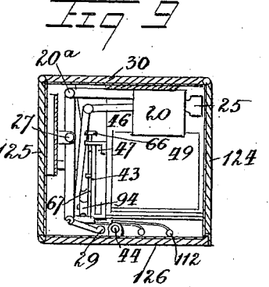
Fig. 5 is a vertical section of the carriage and the parts connected therewith on line 5 5 of Fig. 2.
Figure 6:
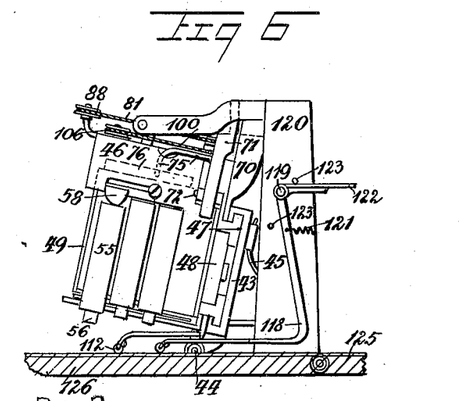
Fig. 6 is an end view of the carriage and the parts connected therewith on the impression side, showing also the line-spacer or paper-feed mechanism.
Figure 10:
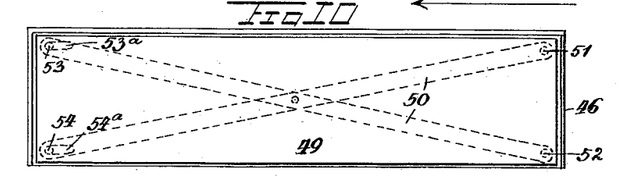
Fig. 10 is a detail plan of a device for guiding the type-box in its movement.
Figure 11:
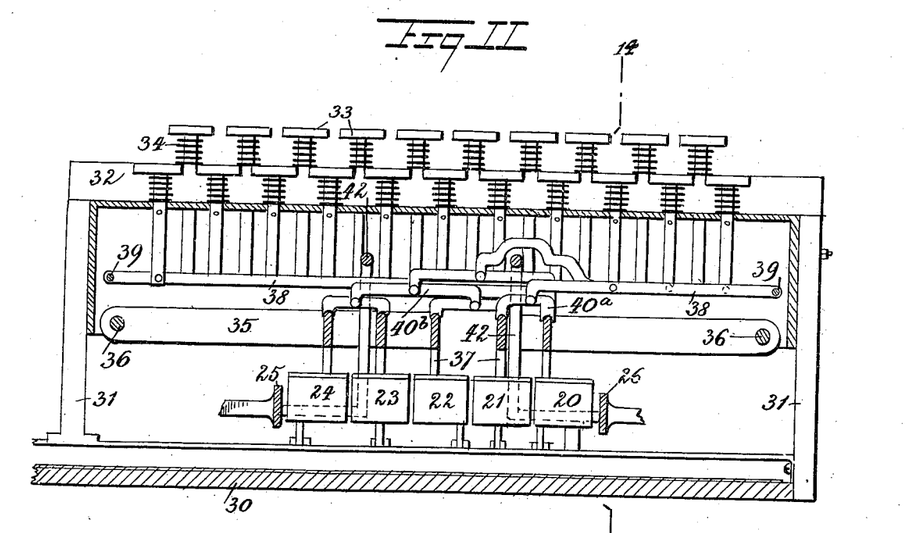
Fig. 11 is a sectional elevation of the synthetizer and the keys operated thereby on line 11 11 of Fig. 14.
Figure 12:
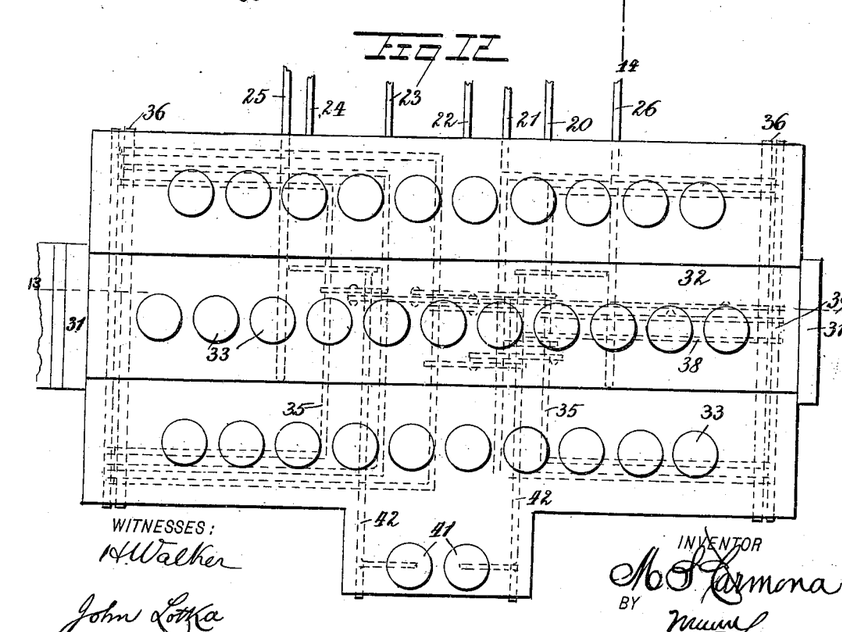
Fig. 12 is a plan of the synthetizer.
Figure 13:
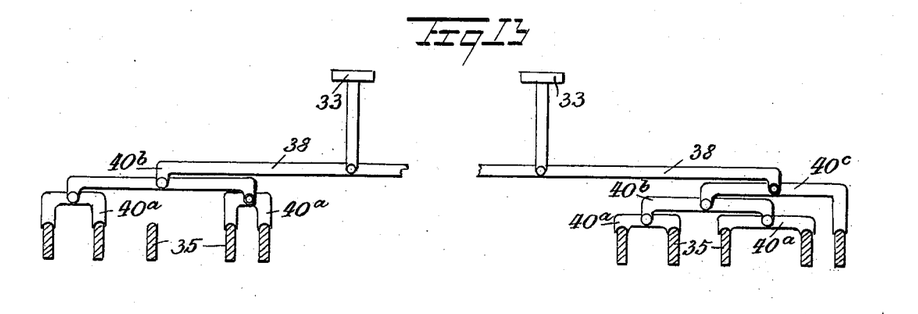
Fig. 13 is a section on line 13 13 of Fig. 12.
Figure 14:
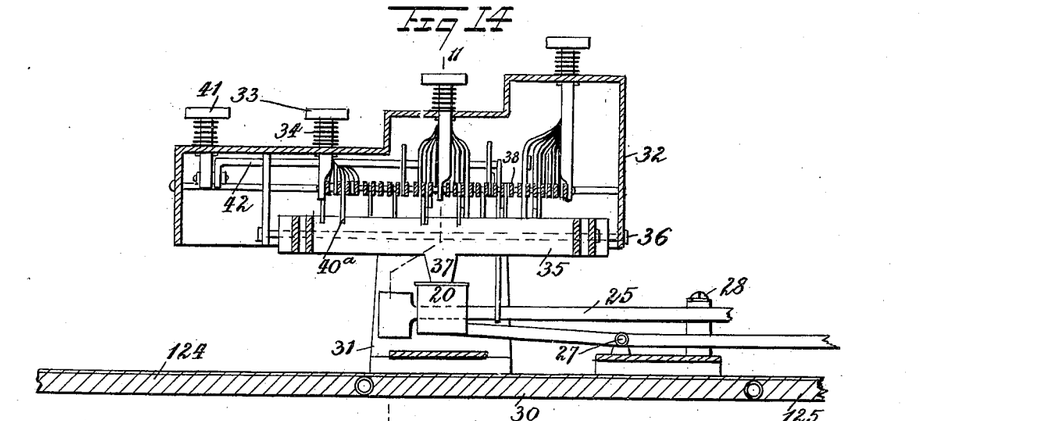
Fig. 14 is a section on line 14 14 of Fig. 11.
Figure 15:
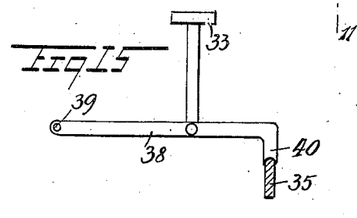
Figs. 15, 16, and 17 show three different synthetizing-levers.
Figure 16:
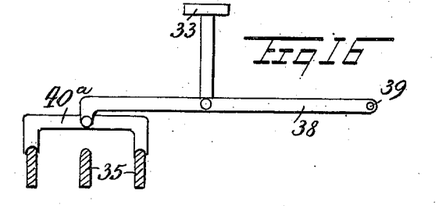
Figure 17:
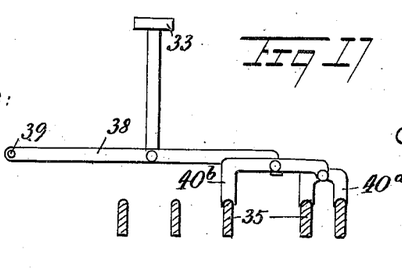

*The type-box*, Figs. 5, 6, and 10.—The carriage 46 is a box-shaped structure in which is arranged to slide from front to rear or transversely the type-box 49. This type-box may be guided in any suitable manner, and, as shown, I provide a lazy-tongs guide 50, one member of which is pivotally secured, as at 51, to the carriage 46, while the corresponding end of the other member is pivotally secured, as at 52, to the type-box. The other ends carry pins 53 54, of which the pin 53 is arranged to slide in a longitudinal groove 53ª of the carriage 46, while the pins 54 slide in a longitudinal groove 54ª of the type-box. It will be seen that the point 51 is fixed relatively to the carriage. The point 53 cannot move transversely in relation to the carriage, but only longitudinally thereof in the slot 53ª. It follows that if the type-box is moved outward—say at the point 52—the whole type-box will be evenly guided in its outward movement. I have selected this construction, because the mechanism which shifts the type-box engages the same near one end, as will be described presently, and in view of the considerable length of the type-box the usual guides, such as tongue and groove, would be liable to cause a binding action.

*The type-carriers*, Figs. 3 to 6.—The type-carriers may be constructed exactly as described in the application for patent hereinbefore mentioned—that is, there may be a series of bands or tapes 55—say three—carrying type 56 on their lower faces. The bands 55 extend longitudinally within the type-box 49, and one end of each band is secured to a spring-barrel 57, journaled in the type-box, and one of the bands is adapted to be projected beyond the others, Figs. 5 and 6, by means of a lug 58, located upon the type-box and arranged to depress one of the shoes 59, which guide the bands 55, at the impression-point. The bands then pass upward, Fig. 3, to engage a pulley 60, journaled in the type-box, and then to an engagement with a pulley 61, journaled in a carriage 62, mounted to slide longitudinally in the type-box 49. A spring 63 tends to draw the carriage in one direction, so as to keep the type-bands taut. The type-bands also engage pulleys 64, journaled in the type-box, and their ends are fastened, as at 65, to the carriage 62.

Figure 1:
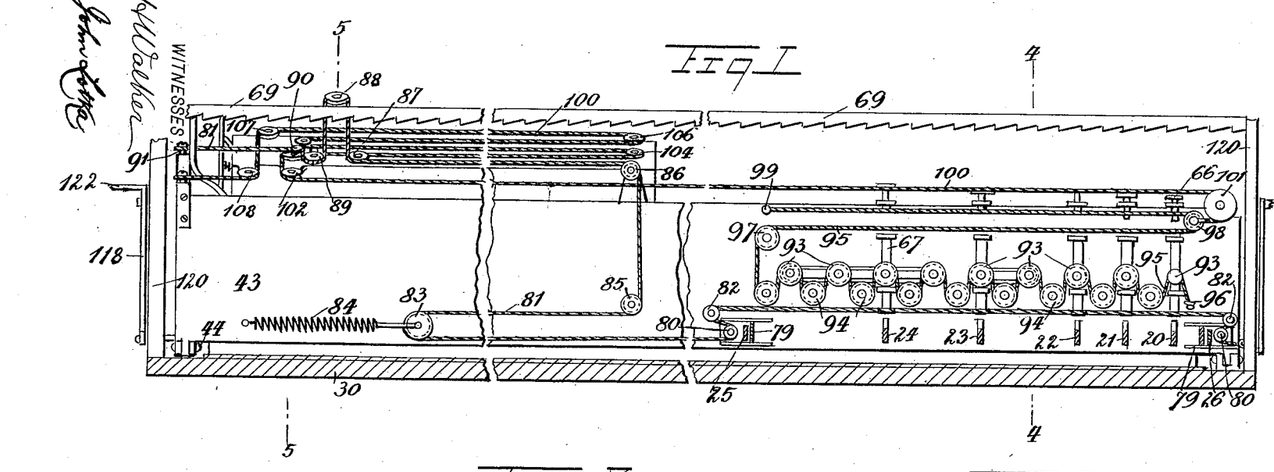
Figure 1 is a sectional elevation of the improved machine on the line 1 1 in Fig. 2 with the synthetizer removed.
Figure 4:
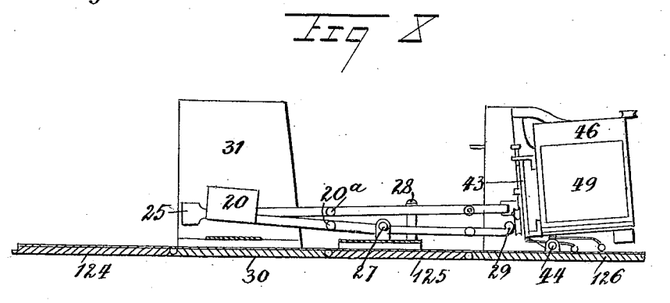
Fig. 4 is a vertical cross-section on line 4 4 of Fig. 2.

*The impression mechanism*, Figs. 1, 4, and 5.—As hereinbefore described, the carriage-guide 43 is pivoted to the base at 44, so that the carriage 46, with the type-box 49, may be swung down to bring the projecting type 56 against the writing-surface. For this purpose the carriage-guide 43 has stops 66, preferably adjustable—for instance, screws, as shown—located in the path of slides 67, movable up and down on the guide 43 and adapted to be operated by the ends 29 of the keys.

Thus when a key is depressed the slide 67 will travel independently until it collides with its stop 66, and then the carriage-guide will be tilted on the fulcrum 44 and bring the carriage 46, with the projecting type 56, against the paper, effecting the impression. Upon the release of the key the spring 45 will return the carriage-guide 43 and the parts carried thereby to their original position. The position of the spring 45, and therefore the normal position of the carriage-guide, may be regulated by the adjusting-screw 68, Fig. 5.

*The carriage-feed mechanism*, Figs. 1, 3, 3ª, 5, and 6.—The carriage 46 at one end carries two pawls adapted to engage a stationary rack 69, extending longitudinally of the carriage-guide 43. One of these pawls 70 is fixed to the carriage, and the other, 71, is pivoted thereto about an approximately-horizontal axis 72 and is under the action of a spring 73. The end wall of the carriage limits the movement of the pawl 71 in one direction, so as to make that pawl rigid with the carriage in the normal position. (Shown in the drawings.) The movement of the pawl 71 in the other direction is limited by the engagement of a projection 75 on the pawl with a bar 76 on the type-box 49. This bar may be stepped, as at 76ª, Fig. 3ª. The fixed pawl 70 projects somewhat in advance of the movable pawl 71; but the distance between the adjacent edges of the pawls is less than the thickness of the rack 69, so that both pawls cannot be disengaged at the same time. A coil-spring 77, connected to the carriage 46 by a cord 78, constantly pulls the carriage in one direction. Normally only the movable pawl 71 is engaged with the rack 69. When the carriage is swung rearward and downward, as during the impression, the fixed pawl 70 engages the rack before the pivoted pawl 71 clears the same, thus preventing any longitudinal movement of the carriage before or during the impression. As soon as the pivoted pawl 71 swings clear of the rack 69 the spring 73 turns said pawl on its pivot 72 until the projection 75 collides with the stop-bar 76. It will thus be obvious that the pivotal movement of the pawl depends on the position of the type-box 49, the movement being greater when the central step 76ª is in the path of the projection 75 than otherwise. When after the impression the carriage is allowed to swing back into the normal position, the fixed pawl 70 (which has remained in engagement with the rack 69 during the impression) swings clear of the rack, but not before the free end of the pivoted pawl 71 has engaged the rack at a greater or smaller distance from the point originally engaged, according to the greater or smaller pivotal movement of said pawl. As soon as the fixed pawl clears the rack the spring 77, which is much stronger than the spring 73, pulls the carriage toward the right (looking from the front or keyboard side of the machine) until such movement is stopped by the renewed engagement of the pivoted pawl 71 with the end wall of the carriage. It will be observed that the shape of the stop 76 governs the amount of feed, and I can thus secure a greater movement of the carriage for capitals than for small letters.

*The mechanism for shifting the type-box*, Figs. 1, 2, 5, 6, and 8.—Upon the tilting carriage-guide 43 are mounted to move longitudinally two slides 79, carrying pulleys 80 and adapted to be actuated by the shifting-keys 25 26. To the guide 43 is secured one end of a cord or other flexible connection 81, which passes over the pulleys 80 and also over relatively-stationary pulleys 82, carried by the guide 43. The cord 81 then passes over a tension-pulley 83 under the influence of a spring 84 and back to a pulley 85, journaled upon the guide 43. Then the cord passes upward to a pulley 86 on the guide 43 longitudinally to a pulley 87, transversely to a pulley 88, back transversely to a pulley 89, and again transversely to a pulley 90, and is finally secured to the guide 43 at 91, the two ends of the cord being thus secured to opposite ends of the guide. The pulleys 87, 88, and 90 are journaled upon the carriage 46; but the pulley 89 is journaled upon the type-box 49, the fulcrum-pin of said pulley passing through a slot 46ª of the carriage, Fig. 2. It will be obvious that the longitudinal movement of the carriage will not affect the position of the pulley 89 relatively to the slot 46ª, and therefore the type-box 49 will normally remain in the same position relatively to the carriage. To shift the type-box, one of the keys 25 26 is operated. This will produce a longitudinal pull on the cord 81 (kept taut by the spring 84) and will cause the pulley 89 to travel in the slot 46ª, the amount of this travel being the same whether the carriage is at one end of the guide 43 or at the other end thereof or at any other point. It will be obvious that the key 25 will produce a movement twice as great as that produced by the key 26, since one end of the cord 81 is secured to the guide 43 adjacent to the key 26. Thus the key 26 may be used for moving the type-box 49 halfway—that is, to bring the pulley 89 to the center of the slot 46ª—while the key 25 will move the type-box to the extreme outer position. By such movement one or the other of the type-bands 55 will be brought into the printing position, the projection 58 causing such type-band to project beyond its neighbors, as indicated in Fig. 6. When the key 25 or 26 is released, a spring 92, Fig. 5, will pull the type-box 49 back to its original position, Figs. 2 and 6.

*The type-locating mechanism*, Figs. 1, 2, 4, 5, and 6.—The type-locating keys 20, 21, 22, 23, and 24 engage by their ends 29 slides 67, movable up and down on the guide 43 and adapted to engage stops 66, as hereinbefore mentioned. It will be observed that the distance between the stops and the slides (when in their normal position) varies with the several keys, being smallest and equal for the keys 20 and 21 and twice as great for the other keys. Each of the slides carries one or more pulleys 93. The slides corresponding to the keys 20, 21, and 22 carry one pulley each. The slide of key 23 carries two pulleys, and the slide of key 24 carries four pulleys 93. Adjacent to the slides pulleys 94 are journaled upon the carriage-guide 43, and a cord 95, one end of which is secured to said guide at 96, passes alternately over the movable or slide pulleys 93 and under the relatively-fixed pulleys 94. After leaving the last pulley 94 the cord 95 passes up to a pulley 97, journaled on the carriage-guide 43, and then to the right longitudinally to a pulley 98, from which the cord is passed to its attaching-point 99 on the carriage-guide. The pulley 98 is movable, being secured to the end of a cord 100, which passes over a pulley 101, journaled on the carriage-guide, and then extends longitudinally of said guide until it engages a pulley 102, journaled upon the carriage 46. The cord 100 then passes over the pulleys 103, 104, 105, 106, 107, and 108 in the manner clearly shown in Fig. 2, all of these pulleys being journaled upon the carriage 46, with the exception of the pulley 105, which is movable in a longitudinal slot $46^b$ in the carriage. The axis or pin of this pulley projects downward (see Fig. 5) to engage a slide 109, Fig. 5, which has a lug $109^a$ always in engagement with the slide 62, whatever the position the type-box 49 occupies. The pulley 98 might be omitted, the cord 95 then passing directly from the pulley 97 to the pulley 101, and being integral with the cord 100. The left-hand end of the cord 100 is secured to the carriage-guide at 110.

It will be observed that the movement of the carriage 46 longitudinally of the guide 43 will not affect the position of the pulley 105 in the slot $46^a$. When any one of the keys is depressed, (or a plurality of keys,) the corresponding slide or slides 67 will move upward, producing a longitudinal pull on the cords 95 100, the amount of the longitudinal movement being as 1, 2, 4, 8, and 16 for the keys 20, 21, 22, 23, and 24. When several keys are depressed, the cord 100 will receive a movement equal to the sum of the movements produced by the keys individually. Such movement will not affect the position of the carriage 46, but will produce a corresponding movement of the pulley 105, and therefore of the slides 109 and 62. The movement of the latter shifts the type-carriers or type-bands 55, thus bringing any one of the types 56 into the printing position or "locating" it. This will take place whether the carriage is at the end of the line or at any other point thereof. It will be observed, Fig. 4, that the key ends 29 are adapted for loose engagement with the lower ends of the slides 67, thus allowing the parts to move freely both during the location of the type and during the impression thereof.

Figure 2:
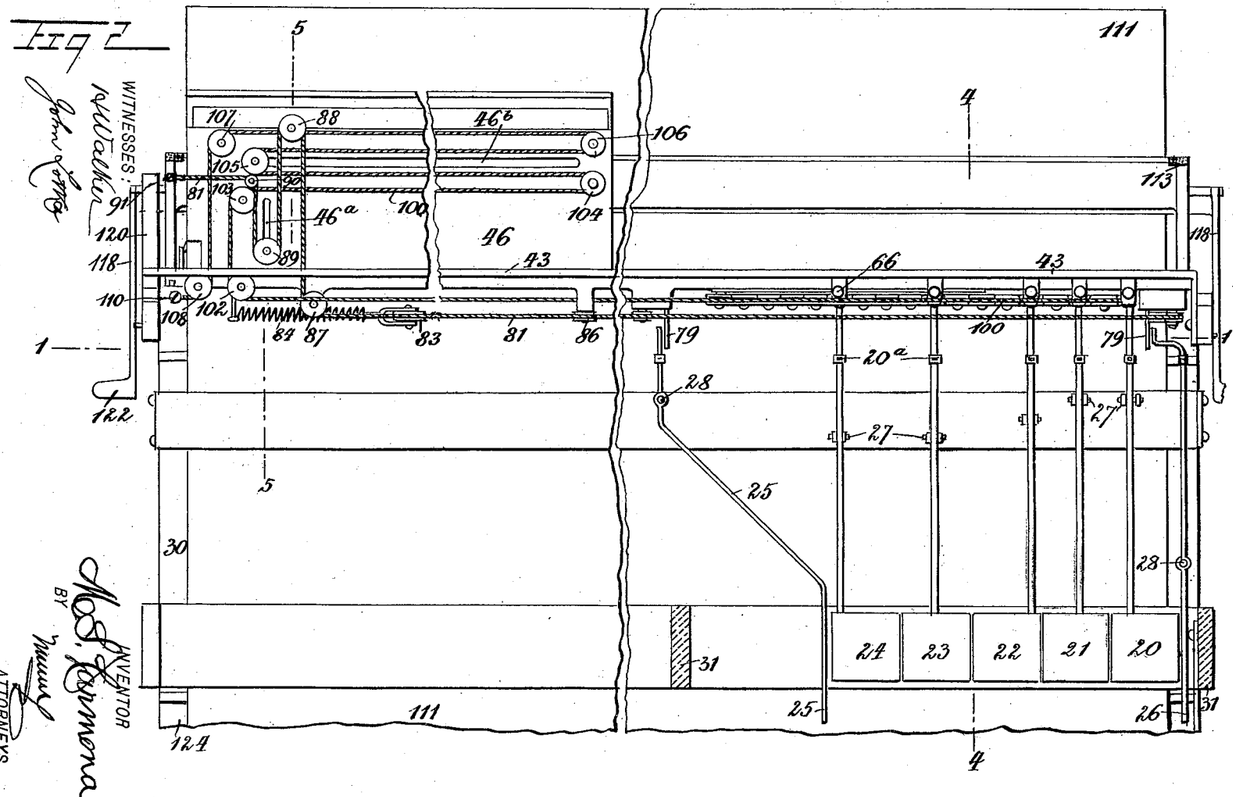
Fig. 2 is a plan with parts in section on line 2 2 of Fig. 4.
Figure 7:
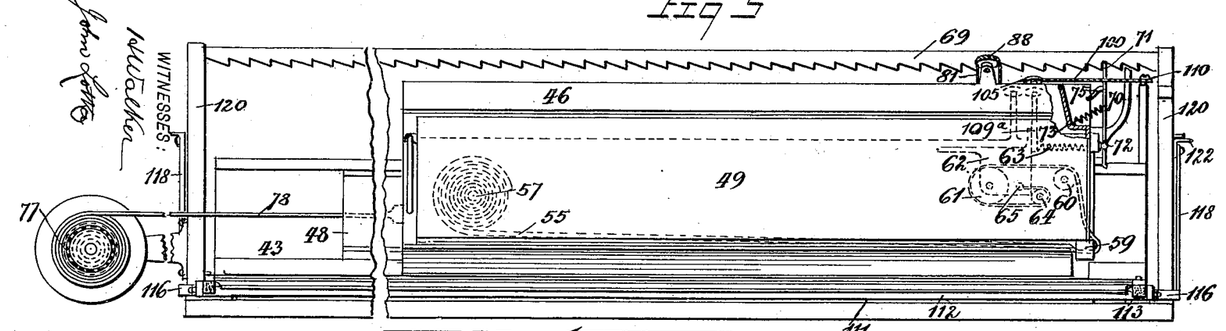
Fig. 7 is an enlarged detail view of the paper-feed mechanism.
Figure 7A:
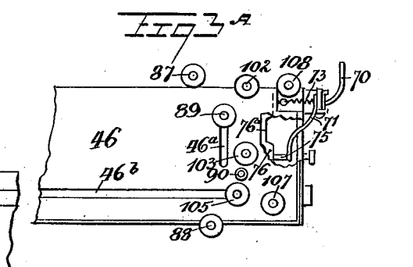

*The paper-feed mechanism*, Figs. 2, 6, and 7.—The paper 111 is normally held against rearward movement by a roller 112, which a rubber brake 113 allows to rotate only in the direction indicated by the arrow. The roller 112 is journaled in an arm 114, secured to a stationary support 115. To feed the paper forward, I provide a roller 116, engaged by a brake 117 and journaled in articulated arms 118, which are pivoted at 119 to brackets 120, secured to the base. Said arms are under the influence of springs 121 and are provided with operating ends or finger-pieces 122. Stops 123 limit the movement of said arms. To feed the paper forward, the finger-piece 122 is depressed, whereby the roller 116 is thrown forward, the rotation of said roller being stopped by the brake 117. Friction will therefore cause a forward movement of the paper until the roller 116 engages the roller 112 or until one of the stops 123 arrests the arm 118. During this forward movement the roller 112 turns freely, so as not to interfere with the feed of the paper. When the arm 118 moves back, the roller 116 turns freely over the paper, which is held stationary by the roller 112.

Figure 9:
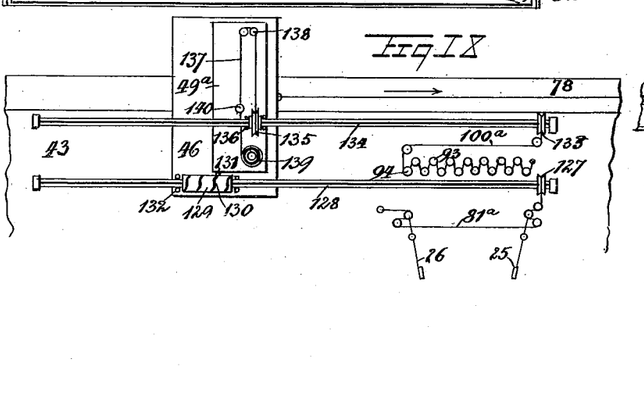
Fig. 9 is an end view with the parts folded into a readily-portable shape.

*The base*, Figs. 8 and 9.—To enable the type-writer to be folded into a compact package, I construct the base of hinged sections 124, 30, 125, and 126. Section 124 forms an end wall or cover in the closed position illustrated by Fig. 9. Section 30, as hereinbefore described, carries the synthetizer. Section 125 carries the pivots for the keys 20 to 26, and section 126 supports the carriage 46 and the carriage-guide 43. The keys 20 to 26 are provided with hinges $20^a$, corresponding in location to the hinges connecting the sections of the base. When it is desired to fold the machine, as shown in Fig. 9, the carriage 46 is brought to the left-hand end of the guide 43, so that the operating ends of the keys (being at the right-hand end of the base) will not collide with the carriage. The synthetizer is removed to fold the machine, as described, and is packed separately.

The operation of the several parts of the machine having been fully explained, I will now describe the form of construction shown in Fig. 18. In this construction many parts are identical with those hereinbefore described. Thus the keyboard and the synthetizer are the same, also the shifting-keys 25 26, with the pulleys 80 and 82. The carriage 46, guide 43, and type-box $49^a$ are substantially the same as hereinbefore described, only the type-box (and consequently each type-band) extends transversely of the guide 43 instead of longitudinally thereof, while the type-box slides longitudinally of the guide to shift the type-bands into the operating position. The cord $81^a$, operated by the shifting-keys 25 26, is secured by one end to a pulley 127, rigid upon a shaft 128, extending longitudinally upon the carriage-guide 43. Upon this shaft is held against independent rotation, but allowed to slide, a sleeve 129, having a spiral or approximately spiral groove 130, engaged by a pin 131 on the type-box $49^a$ and held against longitudinal movement relatively to the carriage by pins 132, secured to the carriage. Thus the sleeve 129 will always occupy the same relation to the carriage. When the shaft 128 is turned by the operation of one of the keys 25 26, the pin 131 will cause a longitudinal movement of the type-box relatively to the carriage, thus shifting one or the other of the type-bands into the operative position. The type-locating mechanism comprises the pulleys 94, journaled on the carriage-guide 43, and the movable pulleys 93, journaled upon the slides 67, with a cord 100$^a$ engaging them, the construction so far being exactly the same as represented in Fig. 1; but for the sake of clearness a diagrammatic showing only has been made in Fig. 18. The end of the cord 100$^a$ is secured to a pulley 133, rigid upon a longitudinal shaft 134, journaled on the carriage-guide 43. Upon this shaft is held against independent rotation, but allowed to slide, a pulley 135, which by projections 136 on the type-box 49$^a$ is held permanently in the same position relatively thereto. This pulley has attached to it a cord 137, passing over guides 138 and secured at the other end to a spring-pulley 139, all journaled on the type-box. To the cord is also rigidly fixed an operating finger or pin 140, which corresponds to the pin of the pulley 105 in the construction first described and operates the type-bands in the same manner.

Having thus described my invention, I claim as new and desire to secure by Letters Patent—

1. A type-writer comprising a stationary keyboard, a guide, a carriage held to travel on the guide, type located on the carriage to travel therewith, means for feeding the carriage, a connection between the keyboard and the carriage to bring the type into the printing position, and means for bringing the type against the writing-surface.

2. A type-writer comprising a stationary keyboard, a guide, a carriage held to travel on the guide, type located on the carriage to travel therewith, means for feeding the carriage, a flexible connection extending longitudinally of the guide and having one end attached adjacent to the keyboard and operated by the keys, and the other end at the opposite end of the guide, pulleys secured upon the carriage and engaged by said flexible connection, another pulley likewise mounted on the carriage and engaged by said connection but movable relatively to the other pulleys, a type-locating mechanism operated by the movement of said pulley and means for effecting the impression.

3. A type-writer comprising a stationary keyboard, a guide, a carriage held to travel on the guide, type located on the carriage to travel therewith, means for feeding the carriage, an operating connection extending longitudinally of the guide and through the carriage, without interfering with the feed of the carriage, said connection being controlled by the keys, a pulley located upon the carriage and operated by said connection, a type-locating mechanism operated by the movement of said pulley, and means for effecting the impression.

4. A type-writer comprising a stationary keyboard, a guide, a carriage held to travel on the guide, type located on the carriage to travel therewith, means for feeding the carriage, a flexible connection extending longitudinally of the guide and having one end attached adjacent to the keyboard and operated by the keys, and the other end at the opposite end of the guide, pulleys secured at opposite ends of the carriage and engaged by the said flexible connection, another pulley mounted on the carriage between the first-named, fixed pulleys, and engaged by return-runs of the flexible connection, but movable relatively to said pulleys in the direction of said return-runs, a type-locating mechanism operated by the movement of said pulley, and means for effecting the impressions.

5. A type-writer comprising a stationary keyboard, a guide, a carriage held to travel on the guide, means for feeding the carriage, a type-box containing a plurality of series of types and movable upon the carriage to bring any one of the series of types into the printing position, stationary shifting-keys for moving the type-box relatively to the carriage, a connection from the keyboard to the carriage to locate the type irrespectively of the position of the carriage relatively to the guide, and means for effecting the impression.

6. A type-writer comprising a stationary keyboard, a guide, a carriage held to travel on the guide, means for feeding the carriage, a type-box containing a plurality of series of types and movable upon the carriage to bring any one of the series of type into the printing position, stationary shifting-keys, a connection operated by said shifting-keys and extending longitudinally of the guide and through the carriage, a member on the type-box arranged in operative relation to said connection to shift the type-box relatively to the carriage when the connection is operated by either one of the shifting-keys, a connection from the keyboard to the carriage to locate the type irrespectively of the position of the carriage relatively to the guide, and means for effecting the impression.

7. A type-writer comprising a stationary keyboard, a movable guide, a type-carriage held to travel thereon, means for feeding the carriage, means for locating the type by the movement of the keys, and means for moving the guide with the carriage to effect the impression.

8. A type-writer comprising a stationary keyboard, a movable guide, a type-carriage held to travel thereon, means for feeding the carriage, means for locating the type by the initial movement of the keys, and means for moving the guide with the carriage by the further movement of the keys to effect an impression.

9. A type-writer comprising a stationary keyboard, a tilting guide, a type-carriage held to travel thereon, means for feeding the carriage, means for locating the type by the movement of the keys, and means for tilting the guide with the carriage to effect the impression.

10. A type-writer comprising a stationary keyboard, a tilting guide, a type-carriage held to travel thereon, means for feeding the carriage, means for locating the type by the initial movement of the keys, and means for tilting the guide with the carriage by the further movement of the keys to effect the impression.

11. A type-writer comprising a stationary keyboard, a tilting guide provided with frames having limited movement, and arranged to be engaged by the keys, and to swing said guide on its fulcrum when the keys are fully depressed, a type-carriage held to travel on the guide and to swing therewith to effect the impression, means for feeding the carriage, and means for locating the type by the independent movement of the frames effected by the initial movement of the keys.

12. A type-writer comprising a base made in hinged sections, a keyboard comprising keys made in sections hinged together parallel with the hinges of the base-sections, and impression mechanism operated by the keys.

13. A type-writer comprising a base made in hinged sections, a keyboard comprising keys made in sections hinged together parallel with the hinges of the base-sections, a type-carriage operatively connected with the keys for locating and printing the type, a guide on which the carriage is adapted to travel, the length of said guide being approximately equal to the aggregate length of the keyboard and carriage, and means for feeding the carriage.

14. A type-writer comprising a base made in hinged sections, a keyboard comprising keys made in sections hinged together parallel with the hinges of the base-sections, a type-carriage operatively connected with the keys for locating and printing the type, a guide on which the carriage is adapted to travel, said guide being divided longitudinally into sections connected by hinges, and means for feeding the carriage.

15. In a type-writer, a keyboard comprising a series of keys for the individual types, another series of keys, much less in number than the individual type-keys, and each different in its action from the other keys of the same series, connections whereby the depression of an individual type-key will produce the depression of one, two or more of the second series of keys, types, type-locating mechanism operated by the second series of keys, and means for effecting the impression.

16. In a type-writer, a keyboard comprising a series of keys for the individual types, another series of keys, much less in number than the individual type-keys, and each different in its action from the other keys of the same series, intermediate levers located between the two series of keys and corresponding in number to the individual type-keys, each lever being engaged by one of the individual type-keys and engaging itself one, two or more of the keys of the second series, types, type-locating mechanism operated by the depression of the keys, and means for effecting the impression.

MANUEL SÁNCHEZ CARMONA.

Witnesses:
JOHN LOTKA,
EVERARD BOLTON MARSHALL.